(12) United States Patent
Hepke

(10) Patent No.: US 6,361,200 B1
(45) Date of Patent: Mar. 26, 2002

(54) GEAR EXTRUDER HAVING GAS VENT PORTS

(75) Inventor: Harald Hepke, Hannover (DE)

(73) Assignee: Hermann Berstorff Maschinenbau GmbH, Hannover (DE)

( * ) Notice: Subject to any disclaimer, the term of this patent is extended or adjusted under 35 U.S.C. 154(b) by 0 days.

(21) Appl. No.: 09/709,472

(22) Filed: Nov. 13, 2000

Related U.S. Application Data

(62) Division of application No. 09/015,523, filed on Jan. 29, 1998, now Pat. No. 6,158,883.

(30) Foreign Application Priority Data

Feb. 1, 1997 (DE) .......................................... 197 03 798

(51) Int. Cl.$^7$ .................................................. B01F 7/00
(52) U.S. Cl. ........................... 366/75; 366/272; 425/203
(58) Field of Search ............................ 366/75, 96, 97, 366/272, 76.5; 425/203

(56) References Cited

U.S. PATENT DOCUMENTS

| | | | |
|---|---|---|---|
| 3,558,282 A | 1/1971 | Evans | |
| 3,831,906 A | * 8/1974 | Wakeman | |
| 4,025,056 A | * 5/1977 | Miles et al. | |
| 4,063,717 A | 12/1977 | Booy | 366/75 |
| 4,137,023 A | * 1/1979 | Moked et al. | |
| 4,480,970 A | 11/1984 | Smith | 418/15 |
| 4,711,647 A | 12/1987 | Gathmann | 95/24 |
| 5,005,982 A | 4/1991 | Kistner | |
| 5,106,198 A | 4/1992 | Mueller | 366/75 |
| 5,123,828 A | 6/1992 | Surface | 425/203 |
| 5,213,737 A | 5/1993 | Ford et al. | 264/109 |
| 5,267,847 A | 12/1993 | Bohm et al. | 425/145 |
| 5,306,452 A | 4/1994 | Todd | 264/102 |
| 5,378,415 A | 1/1995 | Gohlisch | 264/40.1 |
| 5,855,927 A | 1/1999 | Uth et al. | 425/183 |

FOREIGN PATENT DOCUMENTS

| | | |
|---|---|---|
| DE | 24 38 013 | 2/1976 |
| DE | 41 11 219 | 11/1996 |
| DE | 195 16 082 | 11/1996 |
| FR | 489.973 | 3/1919 |

* cited by examiner

*Primary Examiner*—Tony G. Soohoo
(74) *Attorney, Agent, or Firm*—Foley & Lardner

(57) ABSTRACT

The invention relates to a gear extruder for plasticizing and homogenizing rubber mixtures, having at least two gears disposed in chambers in the extruder housing, with the teeth of the gears meshing with one another, and having a port for feeding the rubber mixture to the front of the gears in the extruder housing. The invention is characterized in that gas vent ports are provided in the extruder housing, at the ends of the teeth of the gears, in an area in which the teeth disengage, and/or that at the entrance side of the teeth filled with the rubber mixture. The gas vent ports are provided in the extruder housing in one embodiment so that they extend on the entrance side over no more than half of the circumference of the chambers. By such an arrangement of gas vent ports it has become possible to ventilate a rubber mixture such that volatile components and moisture contained therein can be outgassed, but the rubber mixture is unable to enter the gas vent ports and clog them.

12 Claims, 4 Drawing Sheets

FIG. 2
FIG. 3
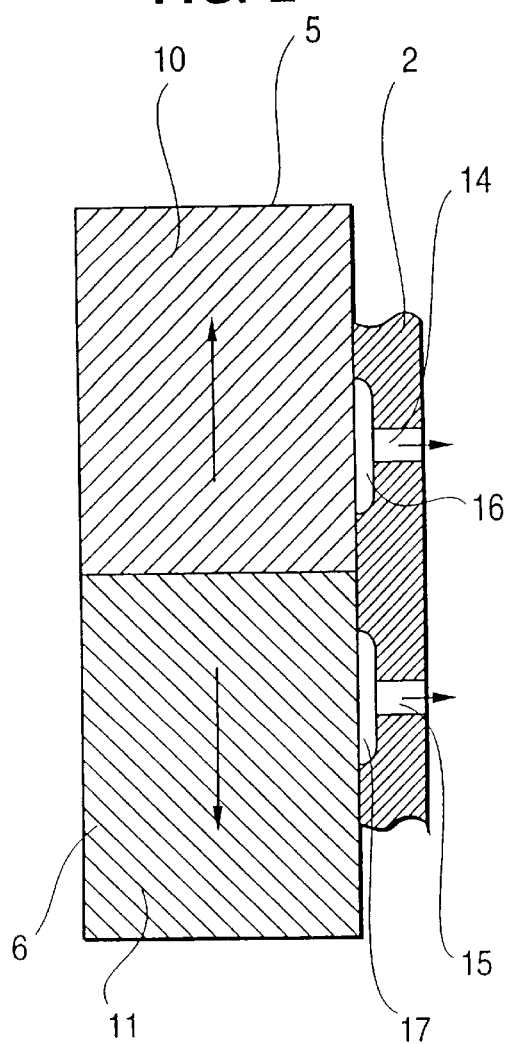
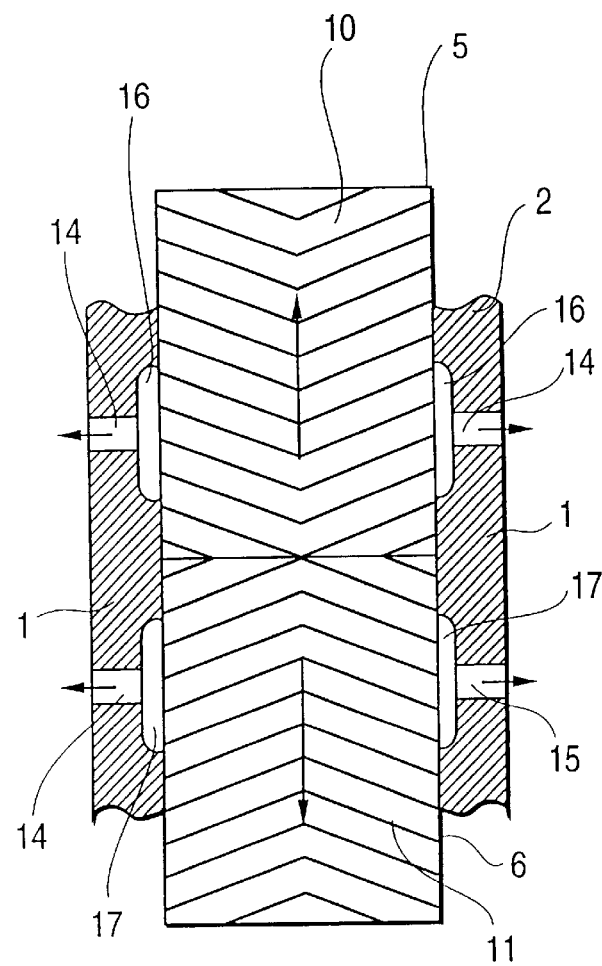

GEAR EXTRUDER HAVING GAS VENT PORTS

This is a divisional of application Ser. No. 09/015,523, filed Jan. 29, 1998 now U.S. Pat. No. 6,158,883.

BACKGROUND OF THE INVENTION

The present invention relates generally to gear extruders, and more particularly to a gear extruder for the plasticizing and homogenizing of rubber mixtures.

It is already known to use gear pumps configured as gear extruders for plasticizing plastic granules (DE-OS 24 38 013). It has already become known to use gear extruders for plasticizing and homogenizing rubber mixtures, in which the gear extruders are fed with cold rubber strips. Such use of rubber extruders is described in the trade publication, "Gummi, Fasern, Kunststoffe" November 1996, pages 880 and 881.

SUMMARY OF THE INVENTION

It has now been found that, as long as it is possible to stabilize the fluctuating bulk stream, gear extruders are also suitable for extruding, by means of a mold disposed on the gear, to extrude not only preliminary shapes for further working, but also to extrude finished profiles. Especially in the production of finished profiles it is necessary, however, to remove to the greatest possible extent the volatile components and the moisture contained in the rubber mixture. This, however, is not possible with the conventional gear extruder.

The invention is addressed to the problem of designing a gear extruder such that, during the extrusion process, the volatile components contained in the rubber mixtures, and the moisture, can be thoroughly removed.

According to the invention, it is arranged that, in the extruder housing, at the ends of the teeth of the gears, in an area in which the teeth disengage from one another and/or that at the input end of the teeth filled with the rubber mixture, in an area extending at the input side over no more than half of the circumference of the chambers, gas vent ports are provided in the extruder housing. By such an arrangement of gas vent ports in areas of no pressure and areas of a slight excess pressure it has become possible to ventilate the rubber mixture such that volatile components and moisture contained in the mixture can be eliminated, and such that the rubber mixture cannot enter into the gas vent ports and clog them.

According to a preferred embodiment of the invention, the gas vent ports are disposed on one side of the gears, and the teeth of the gears are of a helical pattern and are disposed so that the rubber mixture is moved away in the teeth from the gas vent ports. This assures that the rubber mixture being extruded cannot enter the gas vent ports. With the teeth of the gears thus configured it is even possible very effectively to outgas the rubber mixture that is in the teeth, even in areas of low overpressure.

The same effect is obtained if the gas vent ports according to another preferred embodiment of the invention are disposed on both sides of the gears and if the teeth of the gears are configured as herringbone gears and are oriented such that, in the teeth, the rubber mixture is shifted away from the surfaces on which the gas vent ports are disposed. Here too it is brought about that the rubber mixture cannot enter into the gas vent.

Within the scope of the invention it is furthermore provided that the gas vent ports which are formed in the area in which the teeth disengage are in the form of bores. The result is an especially simple solution as regards manufacture.

In a further aspect of the invention, the gas vent ports disposed in the circumferential part of the chambers may be configured as pockets extending over a part of the circumference and corresponding to several teeth of the gears. In such a configuration it is possible to outgas the rubber mixture effectively over a large area.

BRIEF DESCRIPTION OF THE DRAWINGS

FIG. 2 is a longitudinal section taken through the gear extruder of FIG. 1 in the area of the gas vent ports, in which the gears are provided with helical teeth.

FIG. 3 is a longitudinal section taken through the gear extruder of FIG. 1 in the area of the gas vent ports, in which the gears are provided with herringbone teeth.

DETAILED DESCRIPTION OF THE PREFERRED EMBODIMENTS

Figure 1:
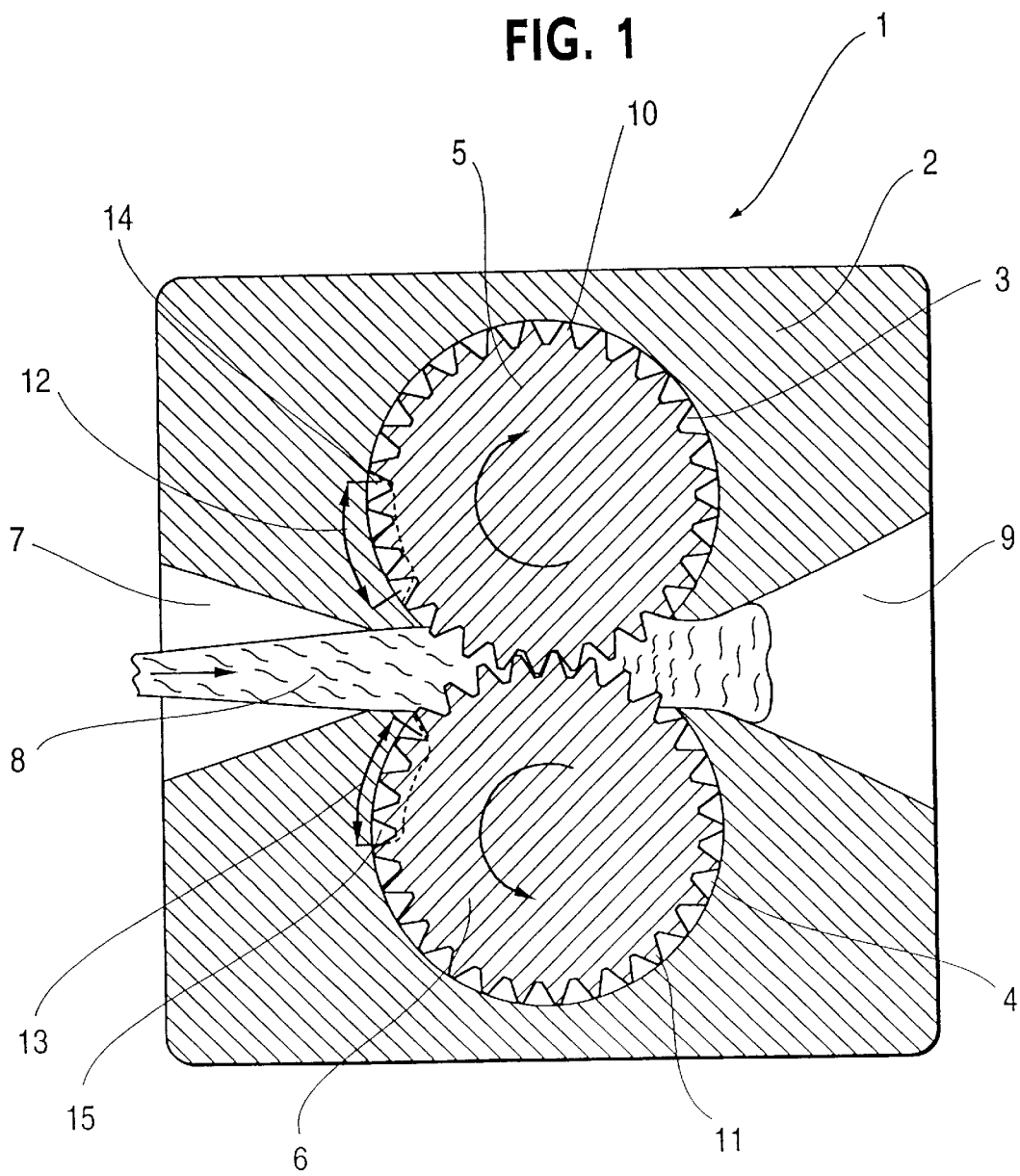
FIG. 1 is a cross section through a gear extruder with gas vent openings extending over a portion of the circumference of the chambers.

In FIG. 1, the numeral 1 identifies a gear extruder with a housing 2. Within the housing 2 are chambers 3 and 4 in which are disposed gears 5 and 6. An input orifice 7 for feeding a rubber mixture 8 is provided in the extruder housing ahead of the gears 5 and 6. Note that although the present invention is described in the context of processing a rubber mixture, it is not limited to that mixture, but could be used to process a wide variety of different mixtures.

At the back end of the housing 2 is an opening 9 for the discharge of the rubber mixture 8 that has been plasticized and homogenized in the gear extruder 1. An injection molding head (not shown in the drawing) can be arranged, if desired, in front of the discharge opening 9.

The gears 5 and 6 are driven in the direction of the arrows by an engine not shown in the drawing, while their teeth 10 and 11 engage one another.

In the gear extruder 1 represented in FIG. 1, gas vent ports 14 and 15 are provided in the extruder housing 2 in the areas 12 and 13 extending over a portion of the circumference of chambers 3 and 4 at the input end.

As can be seen in FIG. 2 of the drawing, the gas vent ports 14 and 15 are arranged in this embodiment on one end of the gears 5 and 6. The gas vent ports 14 and 15 are in the form of pockets 16 and 17 extending over a portion of the circumference in the areas 12 and 13 that comfort end face of the teeth 10 and 11. Moreover, the teeth 10 and 11 of gears 5 and 6 are conveniently configured as helical gear teeth. The helical gear teeth are oriented such that, in the gears, the rubber mixture 8 is moved away in the teeth 10 and 11 from the pockets 16 and 17 of the gas vent ports 14 and 15.

In the embodiment represented in FIG. 3, the gas vent ports 14 and 15 are disposed in areas 12 and 13 at both ends of the teeth 10 and 11 of gears 5 and 6. The teeth 10 and 11 are here configured in a herringbone pattern, which is so aligned that the rubber mixture 8 in teeth 10 and 11 is driven away from the ends of gears 5 and 6, i.e., away from the pockets 16 and 17 of the gas vent ports 14 and 15. Thus the rubber mixture 8 is prevented from entering the gas vent ports 14 and 15 and clogging them.

In the embodiments of the invention represented in FIGS. 1 to 3, the rubber mixture 8 is fed into the input orifice 7 of the gear extruder 1 in the form of a feed strip. The rubber composition 8 is then clutched by the teeth 10 and 11 of the gears 5 and 6 being driven in the direction of the arrows. The rubber mixture 8 then enters into the gaps between the teeth 10 and 11 within the chambers 3 and 4. The rubber material is carried by the teeth 10 and 11 along the walls of the chambers 3 and 4, while energy is introduced and the rubber mixture is plasticized. Simultaneously, through the gas vent ports 14 and 15 disposed on the input end in the areas 12 and 13 at the teeth 10 and 11, an intense outgassing of the rubber mixture 8 takes place. The degassed rubber mixture 8 then passes into the discharge orifice 9 of the gear extruder 1, where a mass pressure is built up for the shaping of the extrudate. Also, by means of an injection molding head, high-quality profiles can be extruded.

Figure 4:
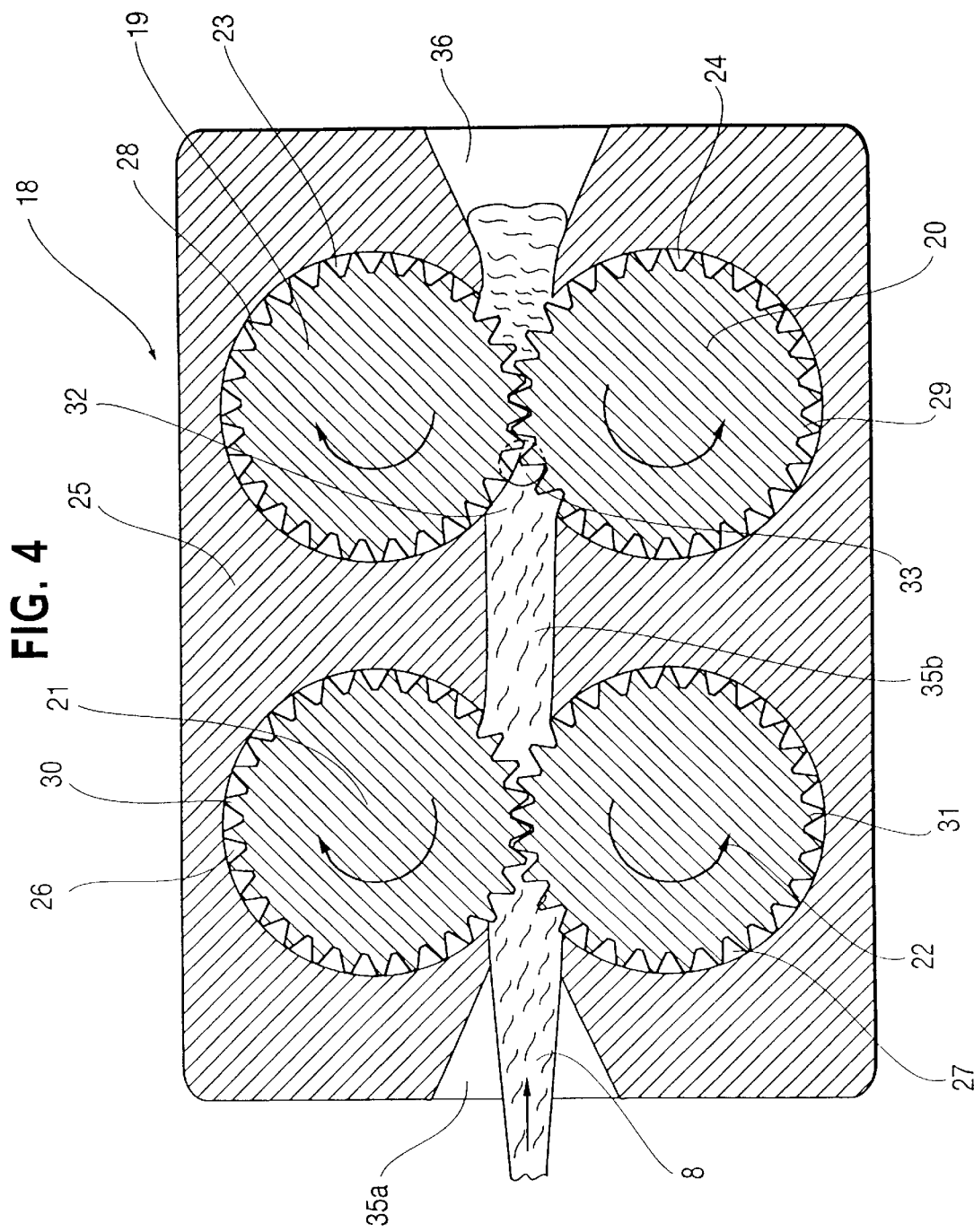
FIG. 4 is a double gear extruder in which gas vent ports are disposed in an area in which the teeth disengage.

In FIG. 4 of the drawing there is shown a double gear extruder 18 having two pairs of gears driven in the same direction, which are formed by gears 19–20 and 21–22. Gears 19–20 are disposed in chambers 23 and 24 of a housing 25 of the gear extruder 18. The gears 21 and 22 are disposed in chambers 26 and 27 of the housing 25. Gears 19 and 20 have teeth 28 and 29. Gears 21 and 22 are provided with teeth 30 and 31.

Figure 5:
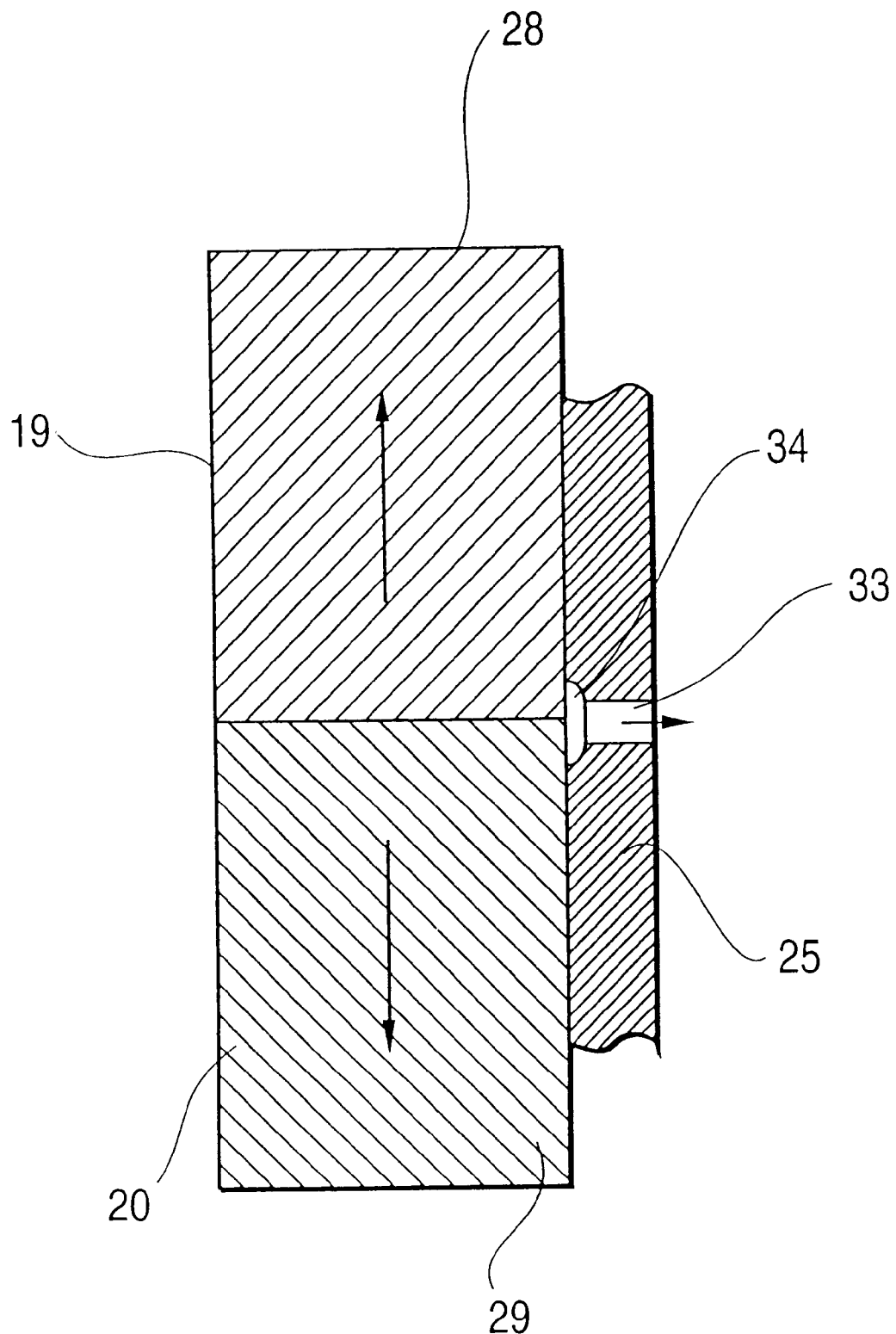
FIG. 5 is a longitudinal section taken through the gear extruder of FIG. 4 in the area of the gas vent ports.

In the extruder housing 25, at the ends of the teeth 28 and 29 of gears 19 and 20, in an area 32 in which the teeth 28 and 29 disengage, a gas vent port 33 is provided. As it appears in FIG. 5, the gas vent port 33 has a pocket 34 at the ends of the teeth 28 and 29.

The gear extruder 18 has an inlet port 35a through which the rubber mixture 8 in the form of feed strips is fed to the gears 21 and 22. The gears 21 and 22 are adjoined by a passage 36 disposed in the housing 25, which forms an outlet zone 36 for the rubber mixture 8, plasticized and homogenized in the teeth 30 and 31 of gears 21 and 22.

Passage 35b opens in an area 32, i.e., in the entry zone of the gears 19 and 20 of gear extruder 18. The homogenized and precompressed rubber mixture 8 is here grasped by the teeth 28 and 29 of gears 19 and 20. In the teeth 28 and 29 of gears 19 and 20 the rubber mixture 8 is finally plasticized and homogenized and lastly enters the output port 36 forming an output zone of the gear extruder 18. In the output port 36 the mass pressure for the shaping of the extrudate is built up. As already described in the case of the embodiment in FIG. 1, an injection molding head, not shown in the drawing, can be disposed here too, if desired, permitting the shaping of a profile.

By arranging the gas vent port 33 in area 32 in which the teeth 28 and 29 of the gears 19 and 20 driven in the direction of the arrow disengage, the pressure drop occurring in this area 32 is advantageously used for the outgassing of the rubber material 8 precompressed by the gears 21 and 22. As it can be seen in FIG. 5, the teeth 28 and 29 are preferably of the helical type. Thus, in the teeth 28 and 29, the rubber mixture 8 is driven away from the gas vent port 33 disposed on the end. It has been found that the helical gear pattern is not absolutely necessary, but it provides additional assurance against any entry of the rubber mixture 8 into the gas vent port 33. Clogging of the gas vent port 33 is thus reliably prevented.

It is furthermore pointed out that, even in the case of the embodiment in FIG. 4, the gears 19 and 20 can be given a herringbone pattern as in the embodiment in FIG. 3. Then gas vent ports can be provided in area 32 on both sides of the teeth 28 and 29. The intensity of the outgassing of the rubber material 8 can thus be further increased if desired.

By the arrangement of two pairs of gears as in the embodiment represented in FIG. 4, a very constant volumetric flow is achieved, and a uniform input of energy is made into the extruded rubber mixture. The result is the additional great advantage that, if desired, profiles of great dimensional stability can be produced in an extrusion head, not represented in the drawing, connected to the output of the gear extruder according to the invention. This fact considerably expands the range of application of the gear extruder 18. Also, high-quality profiles can thus be manufactured at reasonable cost, using the known advantages of gear extruders. In particular, the intense outgassing of the rubber mixture 8 permits the production of pore-free extrusions.

The advantages of a gear extruder system furthermore also lie in low cost of acquisition as well as in the energy consumption which is about 70% less than that of a comparable screw extruder. Also, the system requires a comparatively very small amount of floor space. Basically, it has now become possible to make use of all these advantages even for the extrusion of high-quality pore-free profiles.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A gear extruder for plasticizing and homogenizing mixtures, comprising:

an extruder housing having a feed opening, an outlet opening, and chambers formed therein, each of said chambers encompassed by two parallel walls spaced by a substantially cylindrical wall;

a pair of toothed gears, each gear of said pair of gears being located within a different one of said chambers in said extruder housing, each of said gears being rotatable on a respective axis and having teeth that mesh with the other gear in a teeth-meshing area, each gear also having lateral side faces perpendicular to their respective axis of rotation;

each of said gears being disposed such that its lateral side faces are parallel to the two parallel walls of its respective chamber, and such that when a mixture is fed from said feed opening into a disengaging side of said teeth-meshing area, the mixture is carried along a majority of the circumference of the cylindrical walls of said chambers and such that the mixture flows in a direction perpendicular to the rotation axes of the gears; and at least one chamber being vented by at least one gas vent located across from an area where the teeth of the gears disengage such that gaps between the disengaging gear teeth confronting said chamber may be directly vented by said gas vent port.

2. A gear extruder according to claim 1, wherein said teeth of said gears are of a helical type and adapted for moving the mixture in said meshing teeth away from said pair of gas vent port.

3. A gear extruder according to claim 1, wherein said teeth of said gears are of a herringbone pattern and are adapted for moving the mixture in the teeth away from said gas vent port.

4. A gear extruder according to claim 1, wherein said at least one gas vent port is configured as a bore.

5. A gear extruder for plasticizing and homogenizing mixtures comprising:

an extruder housing having a feed opening, an outlet opening, and a plurality of chambers formed therein, each of said chambers encompassed by two parallel walls spaced by a substantially cylindrical wall;

a plurality of pairs of toothed gears, each gear of said pair of gears being located within a different one of said chambers in said extruder housing, each of said gears being rotatable on a respective axis and having teeth that mesh with the other gear of the pair in a teeth-meshing area, each gear also having lateral side faces perpendicular to their respective axis of rotation;

each of said gears being disposed such that its lateral side faces are parallel to the two parallel walls of its respective chamber, and such that when a mixture is fed from said feed opening into a disengaging side of said teeth-meshing area, the mixture is carried along a majority of the circumference of the cylindrical walls of said chambers and such that the mixture flows in a direction perpendicular to the rotation axes of the gears; and at least one chamber being vented by at least one gas vent located across from an area where the teeth of the gears disengage such that gaps between the disengaging gear teeth confronting said chamber may be directly vented by said gas vent port.

6. A gear extruder according to claim 5, wherein said teeth of said gears are of a helical type and adapted for moving the mixture in said meshing teeth away from said pair of gas vent port.

7. A gear extruder according to claim 5, wherein said teeth of said gears are of a herringbone pattern and are adapted for moving the mixture in the teeth away from said gas vent port.

8. A gear extruder according to claim 5, wherein said at least one gas vent port is configured as a bore.

9. A gear extruder according to claim 5, wherein said plurality of pairs of toothed gears comprise a first pair of toothed gears positioned as the first pair to receive the mixture, and a second pair of toothed gears positioned to receive the mixture after said mixture passes along the circumference of the cylindrical walls of said chamber containing said first pair of toothed gears.

10. A gear extruder according to claim 9, wherein said at least one gas vent is located across from the second pair of toothed gears.

11. A gear extruder according to claim 10, further comprising a second gas vent located across from the first pair of toothed gears.

12. A gear extruder according to claim 9, comprising at least two gas vents located across from the second pair of toothed gears such that the gas vents are on opposite sides of the second pair of toothed gears.

* * * * *